United States Patent

[11] 3,622,964

[72] Inventors Reinhard Wilhelm Leisterer
Bremen, Germany;
Gunther Berkelmann, Achim, Germany;
Heinz Thiede, deceased, late of Lilienthal,
Germany by Irmgard Thiede, administratix
of assets
[21] Appl. No. 842,113
[22] Filed July 16, 1969
[45] Patented Nov. 23, 1971
[73] Assignee **Fried. Krupp Gesellschaft mit beschrankter
Haftung**
Essen, Germany
by said Leisterer and said Berkelmann

[54] **SYSTEM FOR DETERMINING THE DIRECTION OF
ORIGIN OF WATERSOUND WAVES**
7 Claims, 6 Drawing Figs.

[52] U.S. Cl..................................................... 340/6 R,
340/16 R
[51] Int. Cl.......................................................... G01s 3/100
[50] Field of Search............................................ 340/3, 6, 16

[56] References Cited
UNITED STATES PATENTS
3,506,953    4/1970    Rudy............................. 340/3

*Primary Examiner*—Richard A. Farley
*Attorney*—Wolf, Greenfield & Sacks

ABSTRACT: The invention provides an arrangement for determining the direction of sound waves incident within a large area of bearing, using an array of transducers allocated to adjacent sectors of the area and which are periodically scanned to provide indications on an oscilloscope the beam of which is rotated in synchronous relation to the scanning, the direction of origin of sound within each of the different sectors being determined by measuring the phase difference or travel time difference between two of the transducers.

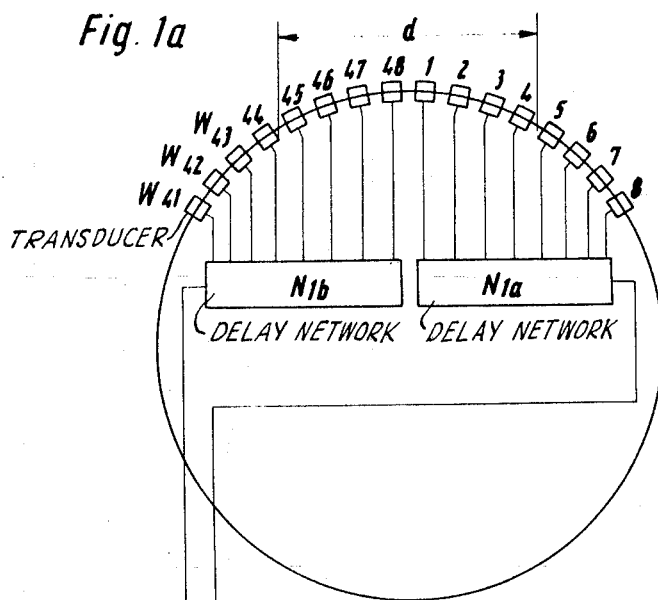
Fig. 1a
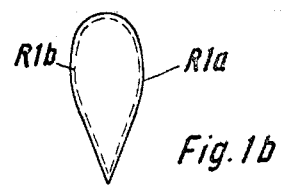
Fig. 1b
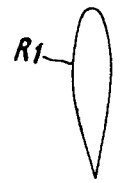
Fig. 1c
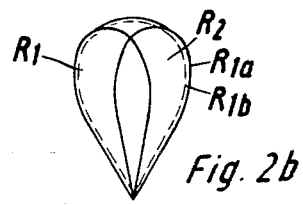
Fig. 2b
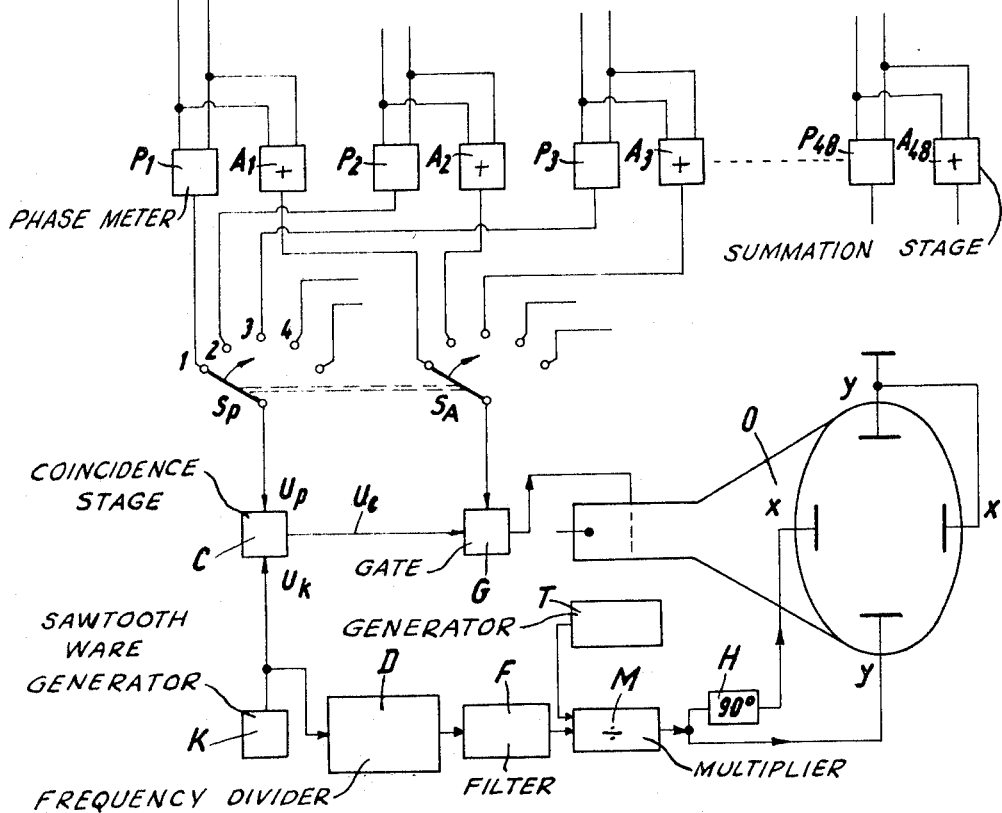

SYSTEM FOR DETERMINING THE DIRECTION OF ORIGIN OF WATERSOUND WAVES

The invention relates to an arrangement for determining the direction of sound waves incident within a large area of bearing, comprising an array of transducers or groups of transducers with beam patterns allocated to different adjacent sectors of said area, and a main scanning device scanning periodically the signals of all sectors of the area and a device for determining the direction of origin within each of said sectors by the aid in each case of two separate receiving channels belonging to each sector and an indicating device in the form of a cathode ray oscilloscope, the beam of which is rotated in a synchronous relation to the scanning effected by said main scanning device.

In prior systems utilizing an array of transducers whose beam patterns are allocated to overlapping adjacent sectors in the manner of a fan having overlapping leaves, it is conventional to determine the direction of the origin of underwater sounds within each sector by the method of interpolating between the amplitudes of overlapping beam patterns of adjacent sectors. This known method has the disadvantage that faulty indications of bearing may result from different amplifications within the two receiving channels. Another disadvantage is that the accuracy of bearing is dependent on the number of overlapping beam patterns used for interpolation and that the accuracy of bearing decreases towards the end of the total area of bearing when the latter is less than 360°.

It is an object of the present invention to provide a bearing determination arrangement in which the above disadvantages are avoided and a more precise determination of direction is obtained without requiring an increase of the number of receiving channels and beam patterns.

It is a further object of the present invention to make use of the known method of measuring the phase difference or travel time difference between two transducers or transducer groups disposed with a spacing between their acoustical centers, for determination of the direction of origin within each of the different sectors of the total area of bearing, taking advantage of the fact that the accuracy of the bearing measurement with such a method is independent of differences between the degree of amplification in both channels and the sensitivity of the separate receivers.

The invention consists in an arrangement for determining the direction of sound waves incident within a large area of bearing, comprising an array of transducers or groups of transducers with beam patterns allocated to different adjacent sectors of said angular area, a main scanning device scanning periodically the signals of all sectors, a device for determining the direction of incidence within each of said sector by the aid of in each case two separate receiving channels belonging to each sector, and an indicating device in the form of a cathode-ray oscilloscope, the beam of which is rotated synchronously with the operation of the main scanning device, each of said two separate receiving channels being connected with separate ones of said transducers or groups of transducers belonging to the same sector and being arranged with a spacing between their acoustical centers, means being provided for measuring the actual phase differences or travel time differences between the signals from said two transducers or two groups of transducers, belonging to the same sector, a timer being provided for each of said sectors which is started by the said main scanning device when entering the corresponding sector, the output signal of the timer controlling the bearing indication by releasing the video signal of the indicating device at the end of the time interval controlled by the said measuring means.

Such an arrangement has the advantage that the accuracy is independent of differences of sensitivity and degree of amplification within the separate receiving channels and that high accuracy of measurement is made possible by using the phase difference or difference of travel time for bearing determination. Besides this, the same accuracy is reached in any one sector independent in whether or not there exists an adjacent sector. Preferably, the means for measuring the actual phase differences are arranged for measuring the phase travel times $\tau$. Thus it is possible to obtain high accuracy of measurement of direction of incidence with received signals of different character and within a broad range of frequency. This is important for many applications of the arrangement.

The means for measuring the phase travel times $\tau$ may consist of a phase meter connected to computer means which are fed by phase difference information from said phase meter and with angular frequency information of the input signals of said phase meter, whereby the output signal of the computer means is only dependent on the phase travel time $\tau$.

The computer means may consist of a control circuit including a monostable multivibrator, the on-time of which is controlled by a control voltage and which multivibrator is triggered by pulses derived from the input signals with said angular frequency $\omega$ and the output voltage of which after filtering by a low-pass filter is proportional to the angular frequency $\omega$ and the on-time, and in which means are also provided to form the difference of the voltages from the phase meter and the monostable multivibrator and a direct voltage amplifier for amplifying said difference voltage which after amplification is fed back to control the on-time of the monostable multivibrator, said amplified difference voltage is additionally used for indication or further control.

The timer may be a monostable multivibrator the on-time of which is controlled by the output signal of the means for measuring the phase travel time.

A true cooperation of the timer with the computer means may be obtained in a simple manner by designing the monostable multivibrator of the timer and the monostable multivibrator of the computer means using identical components with the exception of the condensers determining the on-time. The ratio of the capacity of the condenser of the monostable multivibrator of the computer means to the capacity of the condenser of the monostable multivibrator of the timer is equal to the ratio of the sound velocity in water to the product of the angular frequency of the main scanning device and the distance of the acoustical centers of the corresponding receiving transducers.

An increase of target recognition by an increase of directivity index may be reached with only little increase of technical complication by connecting the outputs of the two receiving channels of each sector to two summation stages in one case delaying the signal of the left channel and in the other case delaying the signal of the right channel by a delay line, thus forming two adjacent beams displaced by half the angle of the sector, and using the signals corresponding to said beams for intensity modulation of the visual display signals. The channels of all beams may be provided each with a gate for passage of its signal only if simultaneously a release signal from the main scanning device corresponding to the same receiving channel and a release signal from the timer are fed to said gate.

The timers controlled by said means for measuring the actual phase may be composed of a coincidence stage and a saw tooth generator, the time base period of which corresponds to the passage time of the main scanning device through a sector. In this case, the coincidence stage transmits the release signal as soon as the sweep voltage has reached the output voltage of the phase measuring means.

In order to make the invention clearly understood, reference will now be made to the accompanying drawings which are given by way of example and in which:

FIG. 1a is a block diagram of a first embodiment of a panorama-sonar-arrangement;

FIGS. 1b, 1c and 2b are beam patterns in the arrangements of FIGS. 1a and 2a; and FIG. 1d is a diagrammatic representation of certain pulses involved in the operation of the arrangement of FIG. 1a.

A transducer array in the form of a cylinder with for instance 48 transducers or receivers $W_1$ to $W_{48}$ is provided for the supervision of an all-around area of 360°. Angularly displaced groups of these transducers are connected to delay networks $N_{1a}$ and $N_{1b}$ and so on for forming beams $R_{1a}$ and $R_{1b}$ and so on each covering sectors of about 15° of the circumference.

One pair of transducer groups is allocated to each sector for instance the groups $W_1$ to $W_8$ and $W_{41}$ $W_{48}$ to sector 1. By the aid of the delay networks $N_{1a}$ and $N_{1b}$ beams $R_{1a}$ and $R_{1b}$ covering one another are formed for sector 1 and corresponding beams for all other sectors.

The transducer groups $W_1$ to $W_8$ and $W_{41}$ to $W_{48}$ belonging to the first sector are arranged with a distance $d$ of their acoustical centers of gravity, so that a phase difference will result between the output-signals of the delay networks $N_{1b}$ and $N_{1a}$ which is dependent on the direction of origin of water sound waves incident within sector 1.

Similar pairs of transducer groups are provided for all 48 sectors of the circumference. The pair of transducer groups $W_2$ to $W_9$ and $W_{42}$ to $W_1$ belong to the second sector which is centered 7.5° apart from sector 1 and the pair of transducer groups $W_{48}$ to $W_7$ and $W_{40}$ to $W_{47}$ belong to the 48th sector. In the following description only the operation in connection with the first sector will be described in detail.

A phasemeter $P_1$ is provided for measuring the phase difference between the outputs of the pair of networks $N_{1a}$ and $N_{1b}$. The output voltage of this phasemeter is proportional to the angle of phase difference.

Figure 1D:
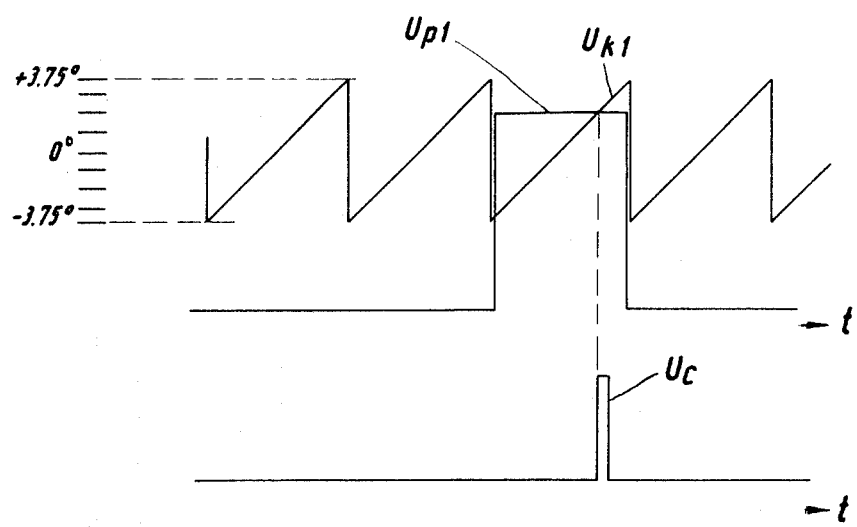

The output signals of the delay networks $N_{1a}$ and $N_{1b}$ are summed up in a summation stage $A_1$. The sum signal will follow the beam pattern $R_1$ of FIG. 1c dependent on the direction of incidence of sound waves within sector 1. The outputs of phasemeters $P_1$ to $P_{48}$ and of the summation stages $A_1$ to $A_{48}$ are scanned by synchronous running main scanners $S_P$ and $S_A$. The output of the main scanner $S_P$ is applied to one of a pair of inputs of a coincidence stage C and the output of the main scanner $S_A$ to one of a pair of inputs of a gate G.

A saw-tooth voltage $U_K$ is applied to the second input of the coincidence stage C from a saw-tooth generator K which is synchronized with the main scanners $S_P$ and $S_A$.

An output pulse $U_C$ is applied to the second input of gate G from the coincidence stage C only if the instantaneous voltage $U_K$ from the sawtooth generator K (see FIG. 1d) is equal to the output voltage $U_P$ of the phasemeter P.

The phasemeters $P_1$ to $P_{48}$ are designed in such a manner that the variation of voltage corresponding to a variation of direction of ±3.75° about the center direction of a sector is equal to the variation of voltage at the output of the sawtooth generator K during the time the main scanner needs to go from one sector to the adjacent one. This arrangement insures that the output pulse $U_C$ of the coincidence stage C will open the gate G at the moment which corresponds to the direction of incidence of sound waves.

In order to obtain a brightening of the spot of the cathode ray within the cathode-ray tube O in a position which corresponds truly to the actual direction of incidence an AC voltage is produced with the aid of a frequency-divider stage D whose frequency is one forty-eighth of the frequency of the sawtooth generator K. This AC voltage is filtered in a filter F and the output signal of the filter is applied to a connected multiplier M whose output is split into two AC voltages with equal amplitude and a phase difference of 90° for obtaining a circular deflection synchronous to the divided frequency from the frequency divider stage D. The phase shift of 90° is performed in the phase shifter H.

The image circle of circular deflection of the cathode ray is in known manner expanded proportional to time in order to produce a panoramic-picture or PPI-display. For this purpose a second sawtooth generator T is provided the output voltage of which is multiplied within the multiplier M by the output voltage of filter F.

In active sonar equipment the sawtooth generator T is synchronized with the echosounding pulse generator and its output signal increases from zero at the beginning of the echosounding period up to a maximum at the end of said period.

It is also possible to use the difference in travel time of the sound waves (phase delay time $\tau$) as a measure for the angle between the direction of incidence and the median direction or plane of symmetry $S_y$ of the sector 1 instead of the phase difference between the signals in the two-receiver channels. Such a measurement of travel time or phase delay time can be performed in such a manner that at first the phase difference between the two output voltages of said receiving channels is established and in a connected computer unit the phase delay time $\tau$ between said two receiving channels is determined. This phase delay time is measured by delay time meters which are comparable to the phase meters $P_1$ to $P_{48}$ in FIG. 1a and are connected to the outputs of the pairs of receiving channels.

Figure 2A:
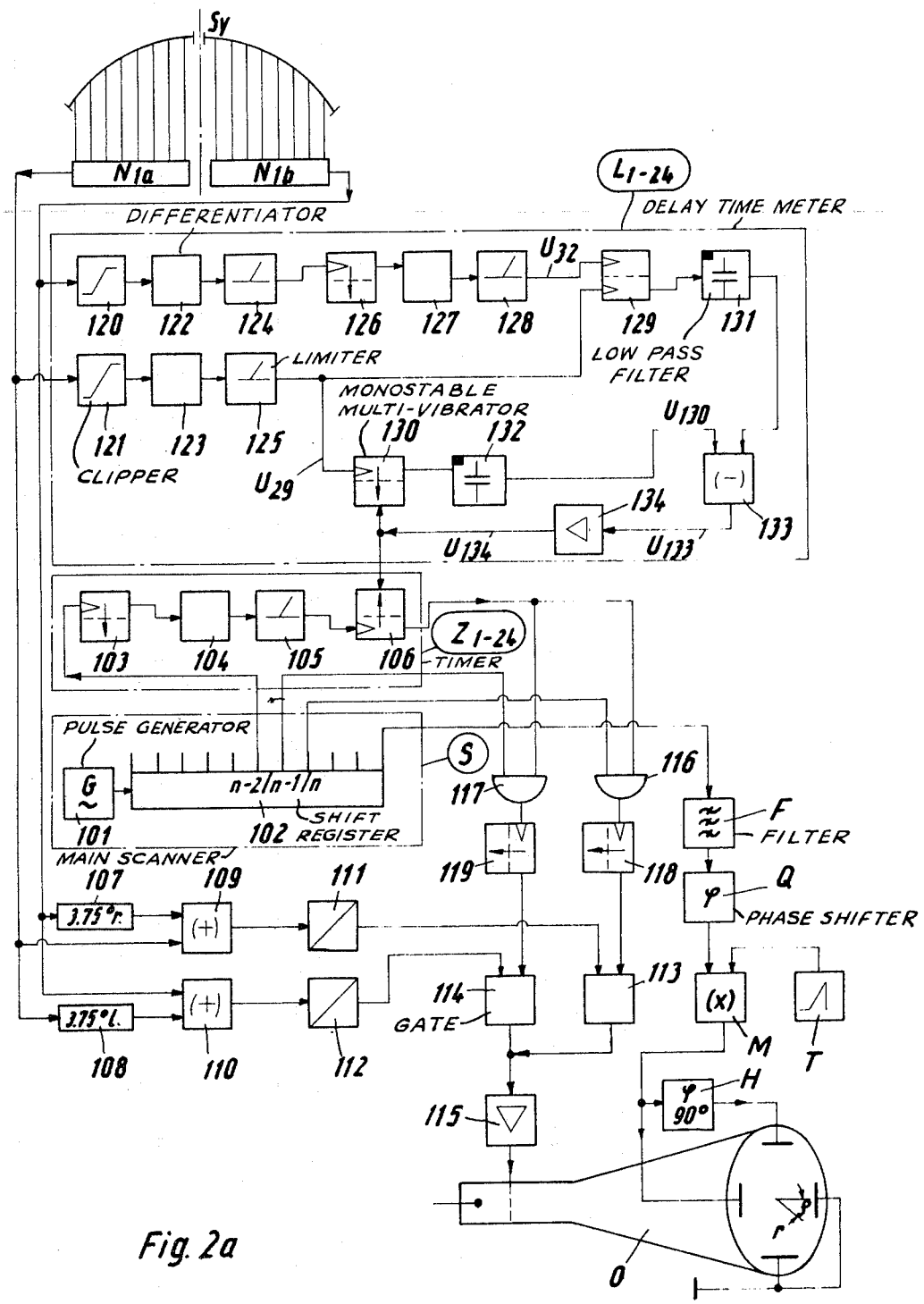
FIG. 2a is a block diagram of another embodiment of a panorama-sonar-arrangement.

The fact that in the embodiment shown in FIG. 2 only 24 pairs of receiving channels are used instead of 48 pairs of receiving channels in the first embodiment results from an alteration which has nothing to do with the measurement of delay time instead of phase difference and which will be clearly understood from the following description.

The phase delay time $\tau$ measured by the delay time meters $L_1$ to $L_{24}$ produces an output voltage the value of which is proportional to the phase delay time $\tau$ and is used to control the timers $Z_1$ to $Z_{24}$. Any of said timers like the sawtooth generator K in FIG. 1a is started at the moment at which the main scanner S arrives at the border of the corresponding sector.

The main scanner S consists of a pulse generator 101 which periodically causes an L-signal to be advanced within a shift register 102. This shift register 102 has 48 outputs. After the L-signal has reached the 48th output it is reshifted to the first output.

The L-signal will be present at each output of the shift register only after 48 steps of the pulse generator 101.

The 24 timers $Z_1$ to $Z_{24}$ are connected with the uneven outputs of the shift register 102. The L-signal at any of said 24 outputs of the shift register will start the connected timer Z by the aid of a monostable multivibrator 103. A needle pulse is produced by the aid of pulse-forming stages 104 and 105 at the trailing edge of the output pulses of the monostable multivibrator 103 according to its adjusted time base and the needle pulse triggers a monostable multivibrator 106. The on-time $\Delta T$ of this multivibrator 106 is controlled by the output voltage $U_{134}$ from the output of the corresponding delay time meter L which output voltage is proportional to the phase delay time $\tau$. Therefore at the end of the on-time $\Delta T$ an output pulse will arrive at the output of the corresponding timer Z.

The output pulses of the timers $Z_1$ to $Z_{24}$ serve for gating a connected gate circuit. If gated, the corresponding gate circuit will pass signals from the corresponding sector to the video input of the cathode-ray tube O. Furthermore the pulse generator 101 in FIG. 2a acts in the same manner as the sawtooth generator K in FIG. 1a and the shift register 102 acts like the frequency divider D in FIG. 1a. The output of the divided frequency at the output of the shift register 102 is filtered within a filter F and behind a multiplier M is split into two deflection voltages with 90° phase difference to produce a circular deflection of the cathode-ray beam in the cathode-ray tube O. In this case a phase shifter Q is inserted between filter F and multiplier M for the purpose of bearing adjustment of the display.

The output voltages from the two receiving channels available at the output of the two delay networks $N_{1a}$ and $N_{1b}$ are added in a first and second channel, said channels including delay lines 107 and 108 respectively for delaying in each case one of said output voltages by a certain interval, so that by summation in summation stages 109 and 110 the resulting voltages correspond to two beams displaced relative to one another by 7.5° and displaced relative to the plane of symmetry $S_y$ of the corresponding sector by +3.75° and −3.75° respectively. By that means, 48 beams are formed by the aid of only 24 pairs of receiving channels.

FIG. 2b shows the beam pattern belonging to the pair of transducer groups $W_1$ to $W_8$ and $W_{41}$ to $W_{48}$. In this diagram $R_1$ is the beam with +3.75° deflection relative to the plane of symmetry $S_y$ available at the output of summation stage 110 whereas the beam $R_2$ is formed at the output of summation stage 109 and has a −3.75° deflection relative to the plane of symmetry $S_y$.

The output voltages of the summation stages 109 and 110 are processed in signal processing stages 111, 112 the output signals of which are available at the gates 113 and 114. As 48 gates are provided corresponding to 48 beams but only 24 timers Z are provided it is necessary to use a selecting circuit in order to obtain the correct coordination between the output signals from the 24 timers Z and the inputs of the 48 gates in accordance with 48 different beams. Two AND-stages 116 and 117 are provided for this purpose, the first inputs of which are connected in parallel to the output of the multivibrator 106 of the corresponding timer whereas the second inputs are connected to different adjacent outputs of the shift register 102 of the main scanner S. Thus the AND-stages are operated one after the other. The signal of the beam $R_1$ for instance will pass the gate 114 if within the delay time meter $L_1$ a travel time is measured which corresponds to a direction of incidence on the left of the plane of symmetry $S_y$ of the pair of transducer groups $W_{41}$ to $W_{48}$ and $W_1$ to $W_8$, whereas the gate 113 will transmit the signal of the beam $R_2$ if the travel time corresponds to a direction of incidence at the right of said plane of symmetry $S_y$.

Monostable multivibrators 118, 119 the time bases of which are adjustable are connected to the outputs of said AND stages 116 and 117 respectively in order to control the effective duration of the signals at the cathode-ray tube.

As already explained above each delay time meter L consists of a phase meter measuring the phase angle Φ of the incoming signals, and a calculating circuit. The output signals of the two receiver channels of one sector are clipped by clippers 120, 121. The clipped voltages at the outputs of said clippers are differentiated in differentiating stages 122 and 123 and fed to limiter stages 124 and 125 which remove the negative voltages thus leaving positive needle pulses at the instants of positive zero crossing of the original signals.

The needle pulses at the output of limiter stage 124 are delayed by a delay time interval $\tau_0$ by help of the combination of monostable multivibrator 126, differentiating stage 127 and limiting stage 128. The delay time interval $\tau_0$ must be longer than the maximum travel time difference between the signals belonging to corresponding beams $R_{1a}$ and $R_{1b}$. The delay time interval $\tau_0$ will preferably correspond to half a period of the highest frequency of the incoming signal.

The needle pulses derived from the receiving channel with delay network $N_{1a}$ trigger a bistable multivibrator 129 which is reset by the needle pulses derived from the receiving channel with delay network $N_{1b}$. Thus at the outputs of bistable multivibrator 129, square pulses of constant amplitude are produced the duration of which corresponds to the difference of travel time of sound waves at the two corresponding receiver groups plus a delay time interval $\tau_0$. From the sequence of square pulses a direct voltage is derived within the following low-pass filter 131. This DC voltage is proportional to the travel time difference $\tau$ and to the angular frequency $\omega$. Within the computer circuits the angular frequency $\omega$ is eliminated in order to leave the proportionality to $\tau$ only. For this purpose said needle pulses from limiter stage 125 trigger a monostable multivibrator 130 at the signal frequency.

The time base of said monostable multivibrator 130 is controlled by a voltage $U_{134}$. By suitable means the time base of the monostable multivibrator 130 is limited between the minimum value 0.2 $\tau_a$ and the maximum value 0.8 $\tau_0$. The output voltage of the monostable multivibrator 130 consists of square pulses of the same amplitude and the same rhythm as the amplitude and rhythm of the square pulses from the bistable multivibrator 129. A direct voltage is also filtered out by a low-pass filter 132. This direct voltage is proportional to the signal frequency of the monostable multivibrator 130 and its time base which is controlled by voltage $U_{134}$. The direct voltage from the low-pass filters 131 and 132 are subtracted from each other within a difference stage 133. The difference voltage $U_{133}$ after amplification in a direct voltage amplifier 134 is fed as control voltage to the input of the monostable multivibrator 130 (voltage $U_{134}$). The stages 130, 132, 133 and 134 form a feedback control circuit which if the loop gain is adequate will secure that the time base of multivibrator 130 practically is equal to the sum of the delay time $\tau_0$ and the travel time difference $\tau$ of the sound waves at the corresponding receiver groups or delay networks $N_{1a}$ and $N_{1b}$. The multivibrator 106 is adjusted parallel to the multivibrator 130 by the same control voltage. This control voltage $U_{134}$ is the output voltage of the phase delay-time-meter $L_1$ or the input voltage of the timer $Z_1$. The multivibrators 106 and 130 are composed in the same manner except the capacity defining their time bases. Therefore the adjusted time bases differ from one another only by a constant factor, namely the ratio of their capacities. This ratio must be chosen in such a way that it harmonizes with the ratio of the water sound velocity to the product of the angular frequency of the main scanner and the distance $d$ of the acoustical center between the two corresponding transducer groups.

By the aid of this means the time base of the multivibrator 106 will be proportional to said difference of travel time and the signal on the cathode-ray tube will provide a thorough reproduction of the direction of incidence.

Various modifications are possible and the invention is not limited to the described embodiments which only show a few applications of the invention. More particularly, the invention may be used also in connection with other transducer arrays.

We claim:

1. Apparatus for determining the direction of emanation of sound waves which may be incident over a large bearing angle, the apparatus comprising a plurality of transducer arrays, each array having its beam pattern allocated to a sector which overlaps the sector of the beam pattern of an adjacent array whereby a large angle of bearing is covered by a sequence of arrays having overlapping beam patterns, the transducers within each array being disposed in two groups having spaced acoustical centers between the groups, the transducers of one group being arranged to be the mirror image of the other group with respect to the median line of the beam pattern of the array, two separate receiving channels for each array, each groups of transducers in an array being coupled to its own receiving channel;

a main scanning device arranged to periodically scan the signals emitted from the plurality of transducer arrays, a cathode-ray tube indicator, means to cause the beam of the cathode-ray tube to rotate synchronously with the scan of the main scanning device, means for measuring the difference in phase or travel time between signals obtained from the two groups of transducers in the same array, the difference measuring means comprising a phase meter whose inputs are coupled to the two groups of transducers in the same array, and computer means having applied to its input the phase difference output of the phase meter and the angular frequency of the input signals applied to the phase meter whereby the output signal of the computer means is dependent only on phase delay time, and a timer for each of the sectors, the timer being started when the scan of the main scanning device enters the timer's sector, the timer controlling the bearing indication on the cathode-ray tube indicator by gating signals from the measuring means to the video input of the cathode-ray tube to cause the video input to accept signals from the array associated with the timer's sector only during the time interval controlled by the timer.

2. An arrangement as defined in claim 1, wherein the computer means consists of a feedback control circuit including a monostable multivibrator, the on-time of which is controlled by a control voltage and which multivibrator is triggered by pulses derived from the input signals with said angular frequency and the output voltage of which after filtering by a low-pass filter is proportional to the angular frequency and its on-time, and in which moreover are provided a difference forming stage for the voltages from the phase meter and the monostable multivibrator and a DC amplifier for amplifying said difference voltage which after amplification is fed to the monostable multivibrator and is used for indication or further control.

3. Apparatus according to claim 1, wherein the timer is a monostable multivibrator and the output signal of the difference measuring means is coupled to that multivibrator to control the duration of its unstable state.

4. Apparatus as defined in claim 5, wherein the monostable multivibrator of the timer and the monostable multivibrator of the said computer means are composed of equal components with the exception of the condensers determining the time base periods, the ratio of the capacity of the condenser of the monostable multivibrator to the capacity of the condenser of the monostable multivibrator being equal to the ratio of the velocity of sound in water to the product of the angular frequency of the main scanning device by the distance of the acoustical centers of the corresponding pair of transducers or groups of transducers respectively.

5. Apparatus according to claim 1, wherein the two receiving channels of each array include delay networks for delaying the channel outputs and further include means in each channel for deriving voltages corresponding to two adjoining beam patterns displaced by half the angular width of a sector, and means responsive to the derived voltages for intensity modulating the cathode-ray tube indicator.

6. Apparatus according to claim 5, wherein the two receiving channels of each array are coupled to a gate, the gate being enabled to pass signals from the two receiving channels upon simultaneously receiving a clear signal from the main scanning device and an output signal from the timer associated with the array.

7. Apparatus according to claim 6, wherein the timer comprises a coincidence stage and a sawtooth generator whose time base period corresponds to the time for passage of the scan of the main scanning device through a sector, the coincidence stage being arranged to transmit the clear signal upon the sawtooth voltage reaching equality with the control voltage of the phase meter.

6* * * *